(12) United States Patent
Yoon et al.

(10) Patent No.: US 12,731,320 B2
(45) Date of Patent: Sep. 8, 2026

(54) METHOD FOR PROVIDING ANIMATION EFFECT AND ELECTRONIC DEVICE SUPPORTING THE SAME

(71) Applicant: Samsung Electronics Co., Ltd., Gyeonggi-do (KR)

(72) Inventors: Youngil Yoon, Gyeonggi-do (KR); Wonbyeong Park, Gyeonggi-do (KR); Eunyoung Choi, Gyeonggi-do (KR); Jeonghoon Kim, Gyeonggi-do (KR); Sangheon Kim, Gyeonggi-do (KR); Jaeyoung Choi, Gyeonggi-do (KR); Yeunwook Lim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 18/101,683

(22) Filed: Jan. 26, 2023

(65) Prior Publication Data

US 2023/0177758 A1 Jun. 8, 2023

Related U.S. Application Data

(63) Continuation of application No. PCT/KR2022/011894, filed on Aug. 10, 2022.

(30) Foreign Application Priority Data

Aug. 10, 2021 (KR) ........................ 10-2021-0105675

(51) Int. Cl.
*G06F 1/16* (2006.01)
*G06F 40/109* (2020.01)
(Continued)

(52) U.S. Cl.
CPC .......... *G06T 13/80* (2013.01); *G06V 30/1801* (2022.01)

(58) Field of Classification Search
CPC ... G06T 13/80; G06T 11/203; G06V 30/1801; G06F 1/16; G06F 40/109; G06F 1/1684
See application file for complete search history.

(56) References Cited

U.S. PATENT DOCUMENTS 7,199,805 B1 4/2007 Langmacher et al.
7,783,370 B2 8/2010 Nixon et al.
(Continued)

FOREIGN PATENT DOCUMENTS

JP 2003-150144 A 5/2003
JP 2007-281985 A 10/2007
(Continued)

OTHER PUBLICATIONS

"CocaCola Animated Logo" YouTube, Juan Mendoza, May 18, 2018, https://www.youtube.com/watch?v=XTrrK9JMYOU (Year: 2018).*

(Continued)

*Primary Examiner* — Xiao M Wu
*Assistant Examiner* — George Renze
(74) *Attorney, Agent, or Firm* — Sughrue Mion, PLLC

(57) ABSTRACT

An embodiment discloses an electronic device which includes a display and a processor electrically connected with the display. The processor may be configured to detect a designated event, identify text to be outputted on the display and a font applied to the text in response to detecting the designated event, the text including a plurality of characters, determine an animation effect to be applied to the text based on the font, where in applying the animation effect, the processor may be configured to display each of the plurality of the characters for a designated time period along a path corresponding to a character shape from a start point toward an end point of each of the plurality of the characters, and display the text to which the animation effect is applied on (Continued)

the display for the designated time period in response to detecting the designated event.

20 Claims, 12 Drawing Sheets

(51) Int. Cl.

| | |
|---|---|
| ***G06T 11/23*** | (2026.01) |
| ***G06T 13/80*** | (2011.01) |
| ***G06V 30/18*** | (2022.01) |

(56) References Cited

U.S. PATENT DOCUMENTS

| | | | | |
|---|---|---|---|---|
| 7,840,901 | B2 | 11/2010 | Lacey et al. | |
| 9,313,451 | B2 | 4/2016 | Kim et al. | |
| 9,374,547 | B2 | 6/2016 | Lee et al. | |
| 9,727,997 | B2 | 8/2017 | Lee | |
| 10,552,514 | B1 * | 2/2020 | Marcum | G06F 40/103 |
| 10,664,695 | B2 | 5/2020 | Ric et al. | |
| 10,997,770 | B1 * | 5/2021 | Kumawat | G06F 40/109 |
| 11,250,303 | B2 | 2/2022 | Howard et al. | |
| 11,507,727 | B2 | 11/2022 | Jiang et al. | |
| 2003/0020999 | A1 | 1/2003 | Tsujimura et al. | |
| 2007/0013700 | A1 | 1/2007 | Yoon et al. | |
| 2007/0271523 | A1 | 11/2007 | Lacey et al. | |
| 2010/0302251 | A1 | 12/2010 | Yoon et al. | |
| 2014/0085311 | A1 | 3/2014 | Gay et al. | |
| 2015/0325022 | A1 | 11/2015 | Betz et al. | |
| 2015/0371410 | A1 | 12/2015 | Hwang et al. | |
| 2017/0090729 | A1 | 3/2017 | Nogueira et al. | |
| 2017/0221253 | A1 * | 8/2017 | Banerjee | G06T 11/001 |
| 2019/0197087 | A1 * | 6/2019 | Betts | G06T 11/203 |
| 2019/0325626 | A1 * | 10/2019 | Tao | G06T 11/60 |
| 2021/0012547 | A1 * | 1/2021 | Kumawat | G06F 40/109 |
| 2021/0124796 | A1 * | 4/2021 | Singh | G06T 11/001 |
| 2022/0327190 | A1 * | 10/2022 | Yan | G06F 1/1652 |
| 2024/0054713 | A1 * | 2/2024 | Helmling | G06T 13/80 |
| 2025/0013815 | A1 * | 1/2025 | Zheng | G06F 40/106 |

FOREIGN PATENT DOCUMENTS

| | | | |
|---|---|---|---|
| JP | 2015-92403 | A | 5/2015 |
| JP | 2017-97845 | A | 6/2017 |
| KR | 10-0518928 | B1 | 10/2005 |
| KR | 10-2008-0037089 | A | 4/2008 |
| KR | 10-2009-0110046 | A | 10/2009 |
| KR | 10-0938992 | B1 | 1/2010 |
| KR | 10-2014-0089146 | A | 7/2014 |
| KR | 10-2014-0110356 | A | 9/2014 |
| KR | 10-2015-0145774 | A | 12/2015 |
| KR | 10-2019-0055213 | A | 5/2019 |
| KR | 10-2019-0076008 | A | 7/2019 |
| KR | 10-2021-0060585 | A | 5/2021 |

OTHER PUBLICATIONS

Hangul Glyph Analysis and Synthesis Based on Circle-Chain Representation; Dec. 2011.

Extended European Search Report dated Aug. 5, 2024.

Communication issued on Jul. 8, 2026 by the Korean Ministry of Intellectual Property in Korean Patent Application No. 10-2021-0105675.

* cited by examiner

METHOD FOR PROVIDING ANIMATION EFFECT AND ELECTRONIC DEVICE SUPPORTING THE SAME

CROSS-REFERENCE TO RELATED APPLICATION(S)

This application is a continuation of PCT International Application No. PCT/KR2022/011894, which was filed on Aug. 10, 2022, and claims priority to Korean Patent Application No. 10-2021-0105675, filed on Aug. 10, 2021, in the Korean Intellectual Property Office, the disclosure of which are incorporated by reference herein their entirety.

BACKGROUND

Technical Field

One or more embodiments disclosed in this document generally relate to a method for providing an animation effect and an electronic device supporting the same.

Description of Related Art

Electronic devices may include a display that functions as the primary input/output interface for accepting inputs and displaying outputs, and recent electronic devices have implemented various visual effects to promote advanced interactions with the user. For example, in the operation of displaying text on the display, an electronic device may apply animation effects which provides dynamic depth and liveness to the text, and thus may support various types of user experience.

SUMMARY

One such animation effect applied to text involves a series of processes for creating a plurality of frame images for representing the animation effect to each character included in the text, displaying the plurality of the frame images at a high frame rate to overlap them in order to display the corresponding characters. Accordingly, the electronic device typically would need to store a large number of frame images corresponding to various characters of the text, which may limit efficient management of the storage space in the electronic device. In addition, when different characters need to be displayed, the plurality of frame images corresponding to various characters need to be loaded and processed, and accordingly the response rate of the electronic device may be lowered. Further, if the plurality of the frame images are not overlapped with high precision, the animation effect is degraded in quality, and user experience may be hindered.

An electronic device according to an embodiment, may include a display and a processor electrically connected with the display, and the processor may be configured to detect a designated event, identify text to be outputted on the display and a font applied to the text in response to detecting the designated event, the text including a plurality of characters, determine an animation effect to be applied to the text based on the font, where in applying the animation effect, the processor may be configured to display each of the plurality of the characters for a designated time period along a path corresponding to a character shape from a start point toward an end point of each of the plurality of the characters, and display the text to which the animation effect is applied on the display for the designated time period in response to detecting the designated event.

A method for providing an animation effect of an electronic device including a display according to an embodiment may include, detecting a designated event, identifying text to be outputted on the display and a font applied to the text in response to detecting the designated event, the text including a plurality of characters, determining an animation effect to be applied to the text based on the font, and in response to detecting the designated event, displaying the text to which the animation effect is applied on the display for a designated time period by displaying each of the plurality of the characters for the designated time period along a path corresponding to a character shape from a start point toward an end point of each of the plurality of the characters.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

In regard to the description of drawings, the same reference numerals will be assigned to the same or corresponding components.

DETAILED DESCRIPTION

Certain embodiments disclosed herein relate to a method for providing an animation effect and an electronic device supporting the same. In one or more embodiments, text with animation effect is displayed based on a drawing path of the text identified from a font of the text.

According to certain embodiments, a display platform for representing text with animation effect based on a drawing path of the text identified from a font of the text may be provided.

According to certain embodiments, by not requiring a plurality of frame images in the process of displaying text with animation effect, various conversions of text may be supported.

According to certain embodiments, by not requiring a plurality of frame images in the process of displaying text with animation effect, efficient management of the storage space of the electronic device may be achieved, and the response rate of the electronic device may be improved.

According to certain embodiments, by not requiring a process to overlap the plurality of frame images in order to display the animation effect, quality and/or reliability of the animation effect may be improved.

Hereinafter, certain embodiments will be described with reference to the accompanying drawings. However, this is not intended to limit the specific embodiments, and it should be understood that various modifications, equivalents, and/or alternatives of the embodiments are included.

Figure 1:
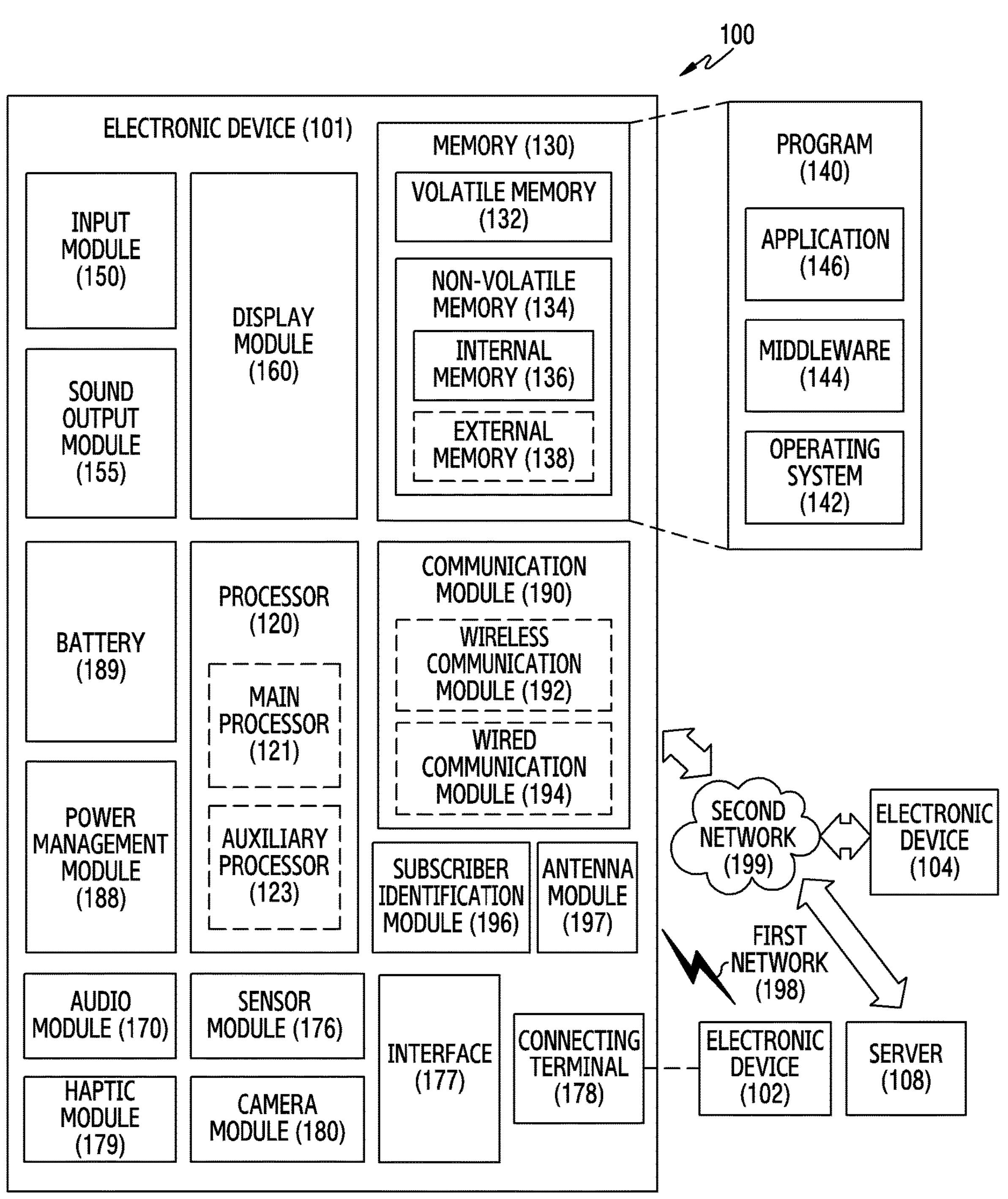
FIG. 1 is a block diagram of an electronic device in a network environment according to an embodiment.

FIG. 1 is a block diagram of an electronic device in a network environment according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
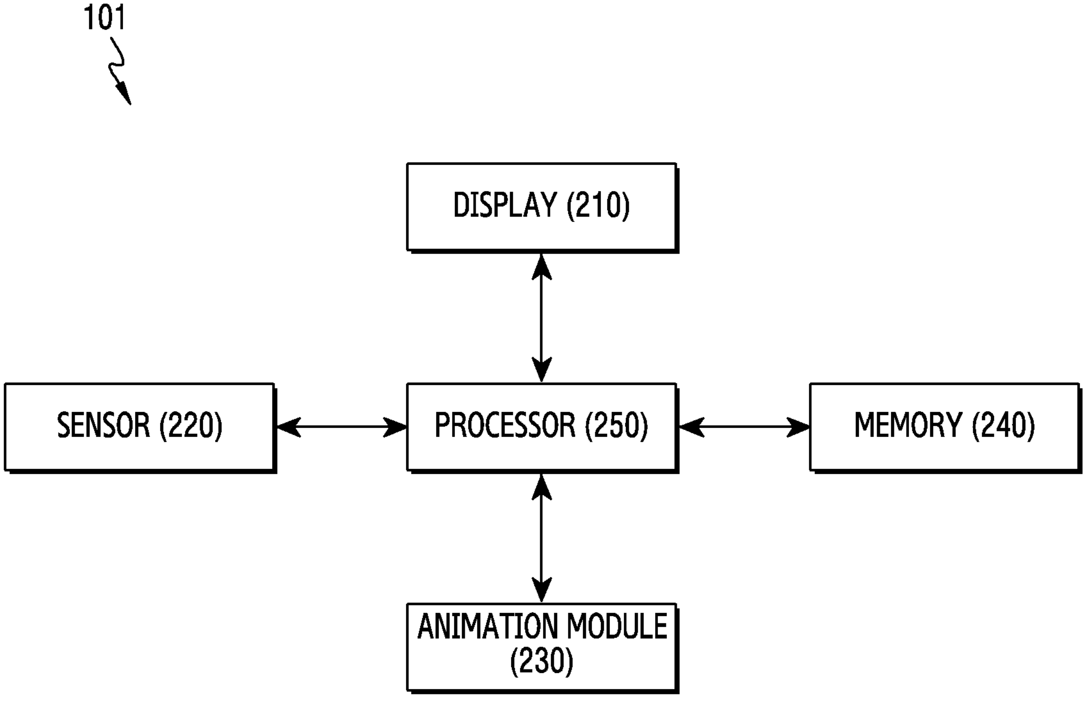
FIG. 2 is a diagram showing some components of an electronic device according to an embodiment.

FIG. 2 is a diagram showing some components of an electronic device according to an embodiment.

Referring to FIG. 2, an electronic device 101 according to an embodiment may include a display 210, a sensor 220, an animation module 230, a memory 240, and a processor 250. According to various other embodiments, the electronic device 101 may omitting at least one of the components shown, or may further include at least one other component. For example, the electronic device 101 may correspond to the electronic device (e.g., the electronic device 101 of FIG. 1) mentioned in FIG. 1, and may further include at least some of the components included in the electronic device 101 of FIG. 1.

In an embodiment, the display 210 (e.g., the display module 160 of FIG. 1) may be exposed at least in part to the outside of the electronic device 101 to visually display various contents. According to an embodiment, the display 210 may include a first display (e.g., first display 320*a* of FIG. 3) exposed at least in part to the outside of the electronic device 101 in a first state (e.g., flat state 301 of FIG. 3) or a second state (e.g., intermediate state 303 of FIG. 3) of the electronic device 101 (e.g., the electronic device 101*a* of FIG. 3) to be described in FIG. 3. In addition, the display 210 may include a second display (e.g., second display 320*b* of FIG. 3) always exposed at least in part to the outside in the first state, the second state 303, and a third state (e.g., folded state 305 of FIG. 3) of the electronic device 101 (e.g., the electronic device 101*a* of FIG. 3). According to another embodiment, the display 210 may include a third display (e.g., third display 410 of FIG. 4) always exposed to the outside of an electronic device (e.g., the electronic device 101*b* of FIG. 4) to be described in FIG. 4. In an embodiment, in the operation of displaying context through a display area (or an active area), the display 210 may display the text by applying a designated animation effect, under control of the processor 250 using the animation module 230.

In an embodiment, at least one sensor 220 may generate electrical signal(s) or data value(s) corresponding to the operation state(s) of the electronic device 101 or external environment state(s). For example, the at least one sensor 220 may include a motion sensor, and may generate, using the motion sensor, electrical signal(s) or data value(s) indicating the positional relationship between a first housing (e.g., first housing 311 of FIG. 3) and a second housing (e.g., second housing 313 of FIG. 3) that together implement the exterior of the electronic device 101. As another example, the at least one sensor 220 may include an acceleration sensor, and may generate, using the acceleration sensor, electrical signal(s) or data value(s) indicating the angle between the display 210 (e.g., the third display 410) and the ground. As yet another example, the at least one sensor 220 may include a touch sensor or a pressure sensor integrated to the display 210, and may generate, using the touch sensor or the pressure sensor, electrical signal(s) or data value(s) indicating user inputs received at the display 210. According to an embodiment, the at least one sensor 220 may provide the electrical signal(s) or the data value(s) generated through the sensing to the processor 250.

In an embodiment, the animation module 230 may support various animation effects for text to be displayed on the display 210. For example, under control of the processor 250, the animation module 230 may identify a font applied to the text to be displayed on the display 210, and determine an animation effect to be applied to each of a plurality of characters (e.g., Hangul, alphabet, Chinese character, number, symbol, and combination thereof inputted through a keyboard) included in the text based on the font. According to an embodiment, the animation effect to be applied to each of the plurality of the characters may include a display of the corresponding character along a path (e.g., drawing path) defined for the corresponding character for a designated time period on the display. For example, the animation module

230 may determine an animation effect of continuously displaying a first character along a first sequence related to the first character during a first time period on the display 210 based on the drawing path of the first character included in the text. In addition, along with the animation effect for the first character, the animation module 230 may determine the animation effect of continuously displaying a second character along a second sequence related to the second character during the first time period on the display 210 based on the drawing path of the second character included in the text.

In an embodiment, the memory 240 may store data related to the operation of the electronic device 101. For example, the memory 240 may store at least one application for providing content on the display 210, and store a font file including at least one font to be applied to the text included in the content. According to certain embodiments, the font to be applied to the text may be provided by a designated application, and may be pre-defined in the memory 240 or the font file, according to a policy of the designated application or user settings for the designated application. In addition, the memory 240 may store at least one instruction related to the functions of the display 210 and the animation module 230.

In an embodiment, the processor 250 may include at least one of a central processing unit, an application processor, and a communication processor, and may control the components of the electronic device 101. For example, the processor 250 may be electrically connected with the components of the electronic device 101, to provide at least one instruction related to the operation of the component to the component, or to calculate or process the electrical signal(s) or the data value(s) received from the component. The processor 250 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure. According to an embodiment, to display on the display 210 the text to which the designated animation effect is applied, the processor 250 may load and execute instructions related to the operations of the display 210 and the animation module 230 stored in the memory 240, and thus control driving of the display 210 and the animation module 230. Thus, it may be understood that the operations executed by the display 210 and the animation module 230 are executed by the processor 250, or are executed under the control of the processor 250. Hereafter, unless explained otherwise, it may be interpreted that the operations performed by the processor 250 correspond to the operations by the display 210 or the operations by the animation module 230.

Figure 3:
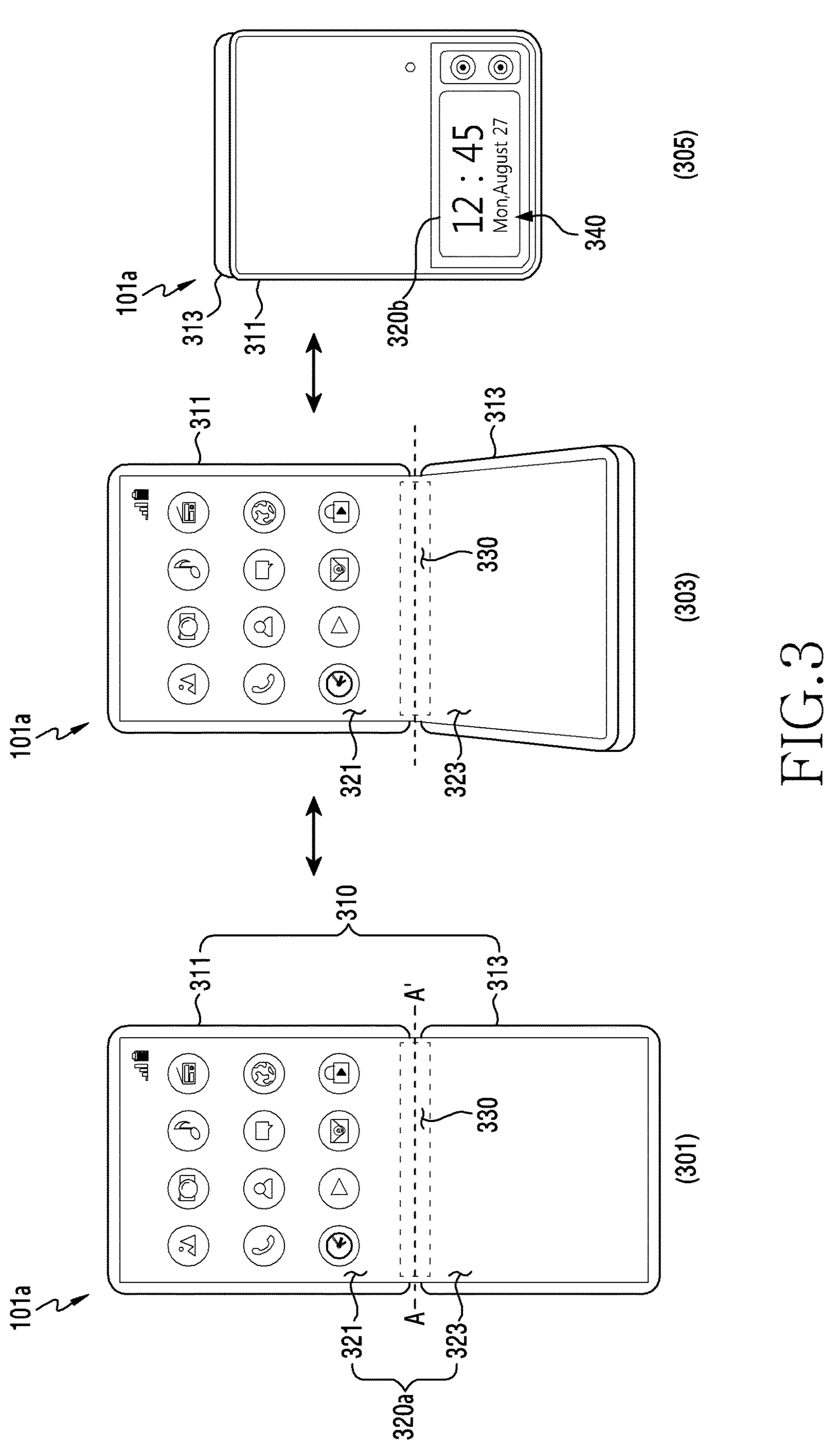
FIG. 3 is a diagram showing an electronic device according to an embodiment.
Figure 4:
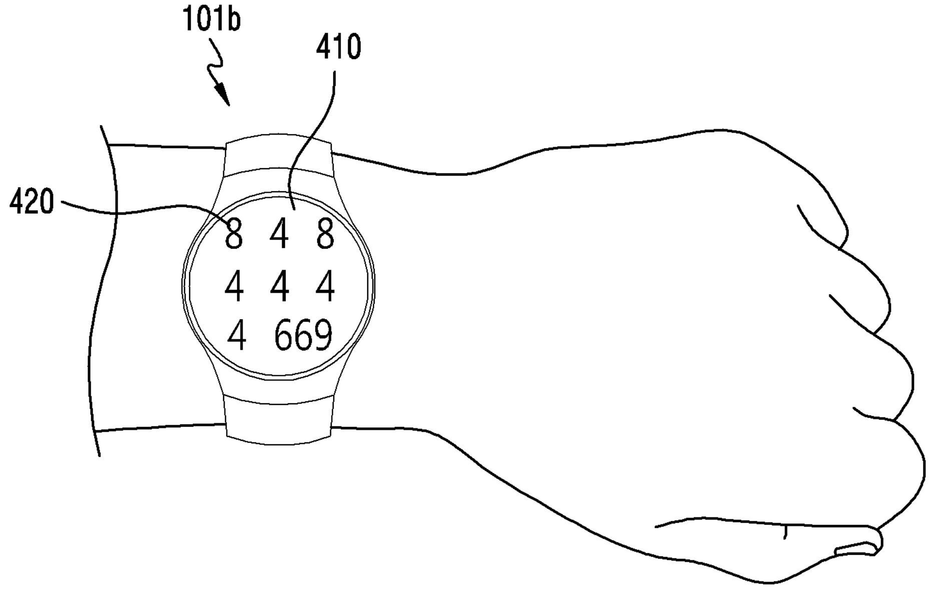
FIG. 4 is a diagram showing an electronic device according to another embodiment.

Hereafter, various mechanisms of an electronic device to which certain embodiments of the present invention may be applied shall be explained by referring to FIG. 3 and FIG. 4.

FIG. 3 is a diagram showing an electronic device according to an embodiment. FIG. 4 is a diagram showing an electronic device according to another embodiment.

Referring to FIG. 3, the electronic device **101*a* (e.g., the electronic device 101 of FIG. 1 or FIG. 2) according to an embodiment may be a foldable device including a housing 310 implemented by a first housing 311 and a second housing 313, a first display 320*a*, and a second display 320*b*. According to an embodiment, in response to folding of the housing 310, an exposure state of the first display 320*a* and the state of the electronic device 101** may be changed.

In an embodiment, the first housing 311 and the second housing 313 disposed symmetrically about the folding axis A-A' may make a first angle (e.g., about 180 degrees) in order to face the same direction. In this case, a first display area 321, a second display area 323, and a third display area 330 overlapping the folding axis A-A' included in the first display **320*a* may be disposed to be co-planar at the first angle and be visually exposed to the outside, and the electronic device 101*a* may be in a first state 301** (e.g., flat state).

In an embodiment, the first housing 311 and the second housing 313 may be disposed to form a second angle (e.g., an angle between about 0 degree and 10 degrees) which is smaller than the first angle in order to face (or to contact) each other. In this case, the first display area 321 and the second display area 323 included in the first display **320*a* may form the second angle while the third display area 330 is deformed or curved. The first display area 321 and the second display area 323 may be disposed to face (or to contact) each other so as to be not visually exposed to the outside, and the electronic device 101*a* may have a third state 305 (e.g., folded state). In an embodiment, if the electronic device 101*a* is in the third state 305, one surface of the first housing 311 which forms a part of a rear surface of the electronic device 101*a* in the first state 301 of the electronic device 101*a* may form a front surface of the electronic device 101*a*. In addition, if the electronic device 101*a* is in the third state 305, the second display 320*b* disposed in one surface of the first housing 311 and visually exposed to the outside toward the back of the electronic device 101*a* may be visually exposed to the outside toward the front (e.g., a user direction) of the electronic device 101*a***.

In an embodiment, the first housing 311 and the second housing 313 may be disposed to form a third angle which is smaller than the first angle and greater than the second angle. In this case, the first display area 321 and the second display area 323 included in the first display **320*a* may be visually exposed at least in part to the outside while making the third angle while the third display area 330 is deformed or curved, and the electronic device 101*a* may be in a second state 303 (e.g., intermediate state) between the first state 301 and the third state 305**.

According to an embodiment, a processor (e.g., the processor 250 of FIG. 2) of the electronic device **101*a* may detect a designated event. For example, the processor 250 may determine occurrence of the designated event, if receiving from at least one sensor (e.g., the sensor 220 of FIG. 2) an electrical signal or a data value indicating that the first housing 311 and the second housing 313 are disposed to make the second angle (e.g., between about 0 degree and 10 degrees) in order to face (or contact) each other. As another example, in a low power state or sleep state of the electronic device 101***a* (or the second display 320*b*), if receiving from the at least one sensor an electrical signal or a data value indicating user input reception with respect to the second display 320*b*, the processor 250 may determine occurrence of the designated event. In response to detecting the designated event, the processor 250 may determine the third state 305 of the electronic device 101*a*, and determine to execute an application which supports displaying text 340 on the second display 320*b*. In addition, the processor 250 may obtain from the application or another application information related to the text 340 (e.g., visual information, date information, weather information, battery information of the electronic device 101*a*, or color information or size information of the characters in the text 340).

Referring to FIG. 4, an electronic device 101*b* according to another embodiment may include a wearable device (e.g., smart watch or smart band) including a third display 410 which is always visually exposed to the outside of the electronic device 101*b*.

In an embodiment, a processor (e.g., the processor 250 of FIG. 2) of the electronic device 101*b* may detect a designated event. For example, the processor 250 may determine occurrence of the designated event, if receiving from at least one sensor (e.g., the sensor 220 of FIG. 2) an electrical signal or a data value indicating that the angle of the third display 410 with the ground is within a designated range (e.g., the angle is within the designated range when the user's gaze direction is aligned with the third display 410). As another example, in a low power state or sleep state of the electronic device 101*b* (or the third display 410), if receiving from the at least one sensor 220 an electrical signal or a data value indicating user input reception on the third display 410, or if detecting a user manipulation of a physical button (not shown) or a wheel key (not shown) included in the electronic device 101*b*, the processor 250 may determine occurrence of the designated event. In response to detecting the designated event, the processor 250 may determine to execute an application which supports displaying text 420 on the third display 410. In addition, the processor 250 may obtain from the application or another application information related to the text 420 (e.g., visual information, date information, weather information, battery information of the electronic device 101*a*, or color information or size information of the characters in the text 340).

Although not depicted, according to certain embodiments, the electronic device (e.g., the electronic device 101 of FIG. 1 or FIG. 2) may be implemented as other devices different from the foldable electronic device 101*a* or the wearable electronic device 101*b*. For example, the electronic device 101 may be implemented as a slidable device which varies (e.g., expands or reduces) its display size in response to sliding of its housing (e.g., sliding of the second housing with respect to the first housing), a smart glasses device or a head mount display device worn near the user's eyes, a display device mounted on a dashboard of a vehicle, and/or a home appliance device supporting internet of things (IoT) technology. Hence, the electronic device 101, which includes the display, and includes component(s) or application program(s) for displaying text on the display to which animation effect is applied, may not be limited to the embodiments shown in the figures. In addition, the animation effect for the text may be implemented in the electronic device 101 for supporting at least one display operation environment, such as a two-dimensional (2D) display space or a three-dimensional (3D) display space.

Figure 5:
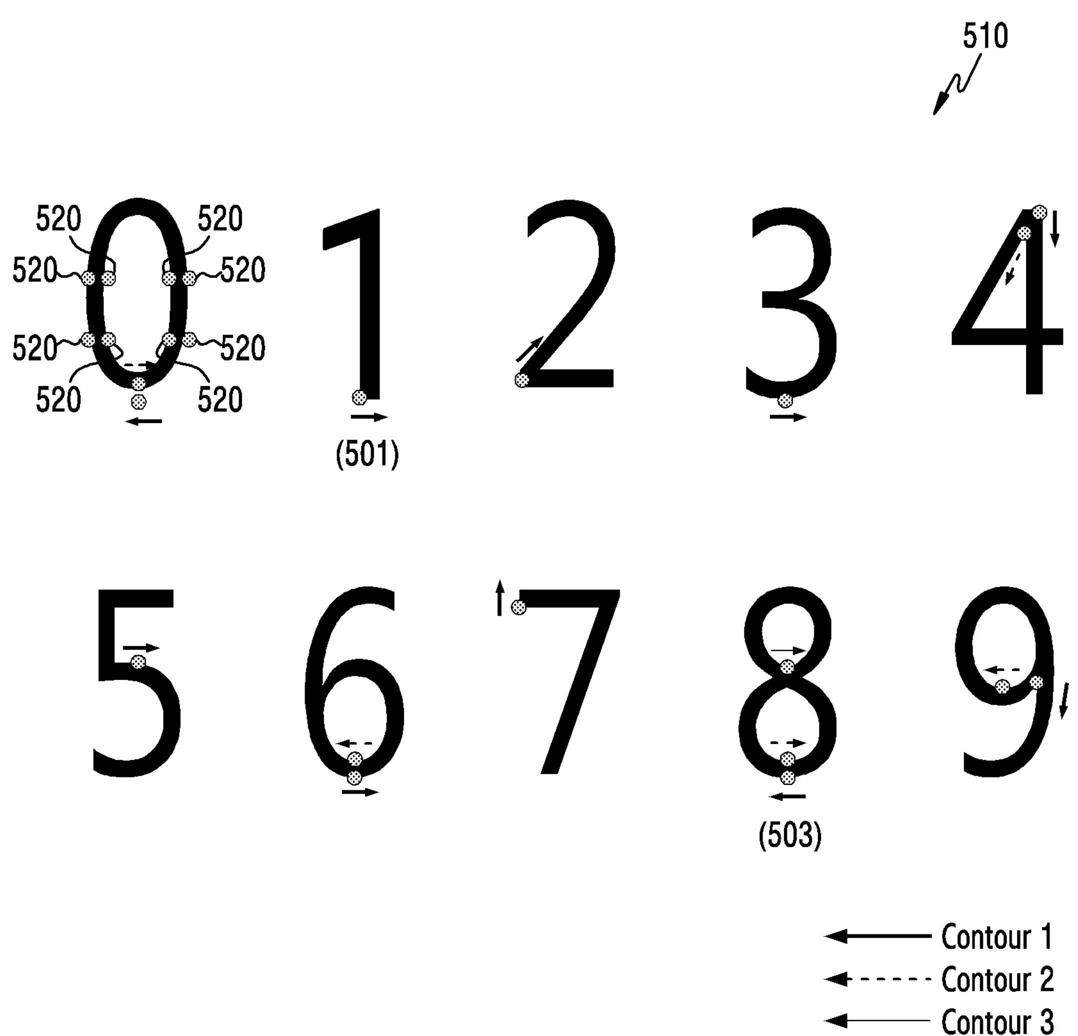
FIG. 5 is a diagram showing a contour of text to be outputted on a display according to an embodiment.
Figure 6:
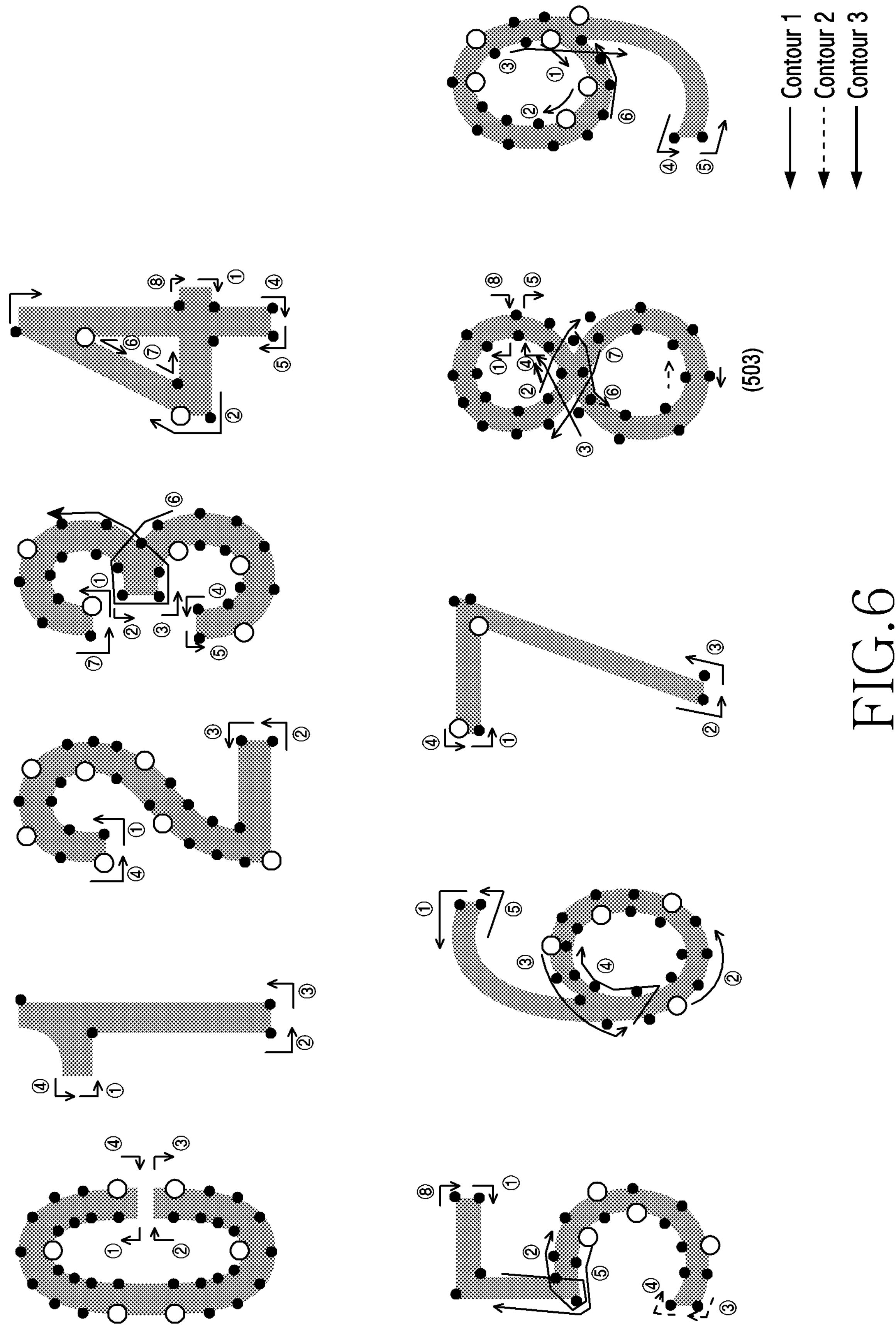
FIG. 6 is a diagram showing a single contour of text to be outputted on a display according to an embodiment.
Figure 7:
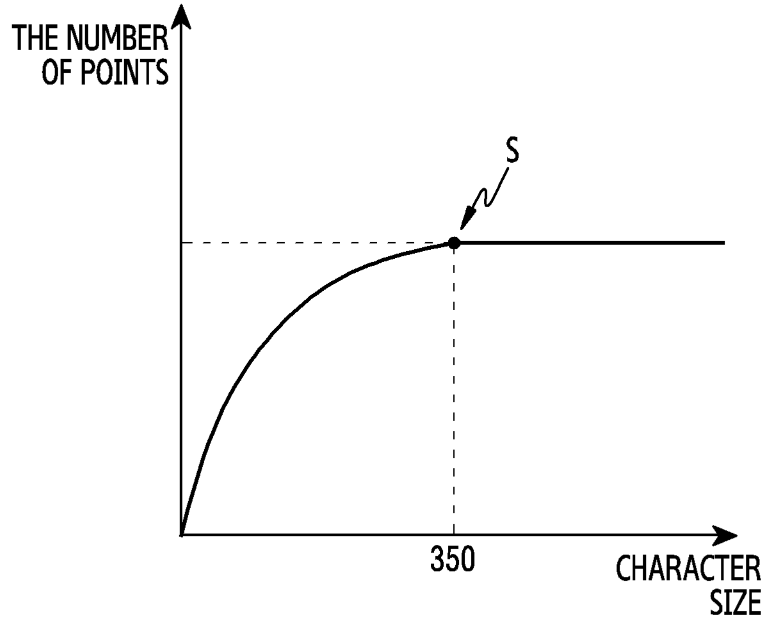
FIG. 7 is a diagram showing a maximum size determination of text to be outputted on a display according to an embodiment.

FIG. 5 is a diagram showing a contour of text to be outputted on a display according to an embodiment. FIG. 6 is a diagram showing a single contour of text to be outputted on a display according to an embodiment. FIG. 7 is a diagram showing a maximum size determination of text to be outputted on a display according to an embodiment.

Referring to FIG. 5, in response to detecting a designated event, a processor (e.g., the processor 250 of FIG. 2) of an electronic device (e.g., the electronic device 101 of FIG. 2) may identify text 510 to display on a display (e.g., the display 210 of FIG. 2) and a font to be applied to the text 510. For example, the processor 250 may obtain the text 510 from an application to execute according to occurrence of the designated event, and may obtain the font corresponding to the text 510 from a font file stored in a memory (e.g., the memory 240 of FIG. 2). In certain embodiments, the text 510 may include a plurality of characters for indicating at least one of attribute related information (e.g., time information, date information, or weather information) of the application (e.g., clock application, calendar application, or weather application) which supports displaying the corresponding text 510 and operation state related information (e.g., battery information or location information) of the electronic device 101. In response to obtaining the text 510 and the font, the processor 250 may determine to apply the animation effect for the text 510, and perform a series of processes.

According to an embodiment, the processor 250 may identify a contour of each of the plurality of the characters in the text 510, as at least part of the process for applying the animation effect to the text 510. In this regard, the font applied to the text 510 may be a vector-system-based font which connects points (e.g., 520) for representing each of the plurality of the characters in the text 510 with lines each having a particular direction and length. The processor 250 may identify the contour in each of the plurality of the characters to which the font is applied based on various straight line(s) and/or curved line(s) connecting the points (e.g., 520).

According to an embodiment, the contour identified in each of the plurality of the characters may include one closed contour or a plurality of closed contours according to the shape of the corresponding character to which the font is applied. For example, a first character 501 may include one contour (e.g., contour 1) closed with a straight line, a curved line, or a combination of the straight line and the curved line connecting the points to represent the first character 501 in the font. As another example, a second character 503 may include three contours (e.g., contour 1, contour 2, and contour 3) closed with a straight line, a curved line, or a combination of the straight line and the curved line connecting the points to represent the second character 503 in the font.

Referring to FIG. 5 and FIG. 6, the processor (e.g., the processor 250 of FIG. 2) may convert one or more contours identified in each of the plurality of the characters of the text 510 into a single contour, as at least part of the process for applying the animation effect to the text 510. For example, the processor 250 may convert one or more contours identified in each of the plurality of the characters included in the text 510 into a single contour and draw the contour on the display as one continuous stroke.

According to an embodiment, one contour identified in a designated character and a single contour converted from the one or more contours may be different concepts at least in part. For example, the one contour may be a straight line, a curve line, or a combination of the straight line and the curved line closed according to the shape of the character, and may only represent part of the character. In contrast, the single contour may be a straight line, a curve line, or a combination of the straight line and the curved line generated from one or more contours identified in the character, and may represent the character in its entirety so that drawing the single contour along one continuous stroke based on a designated drawing sequence draws the character on the display.

In an embodiment, the processor 250 may convert one or more contours of each of the plurality of the characters into the single contour based on an eulerian trail scheme. For example, the processor 250 may convert the three contours (e.g., the contour 1, the contour 2, and the contour 3) included in the second character 503, into a single contour which starts from one point (e.g., any one point in the points representing the second character 503) in the single contour and arrives at the one point of the single contour via one continuous stroke of a first section ① (e.g., the start section), a second section ②, a third section ③, a fourth section ④, a fifth section ⑤, a sixth section ⑥, a seventh section ⑦, and an eighth section ⑧ (e.g., the end section) according to the designated drawing sequence.

According to an embodiment, as at least part of the process for applying the animation effect to the text 510, the processor 250 may perform size normalization on the text 510, before identifying the contour of each of the plurality of the characters of the text 510. In this regard, referring to FIG. 7, if the character size included in text is changed, the number of points representing the character may change. For example, if the character size increases within a specific range (e.g., size range between 1 and 350), the number of points representing the character may increase. In addition, if the character size increases beyond the specific range, the number of the points representing the character may have a threshold s, so that the number of points no longer increases. Hence, to apply the animation effect of uniform quality to the plurality of the characters of the text, the processor 250 may determine the text size for normalization within the specific range in which the number of the points representing each of the plurality of the characters does not exceed the threshold s.

Figure 8:
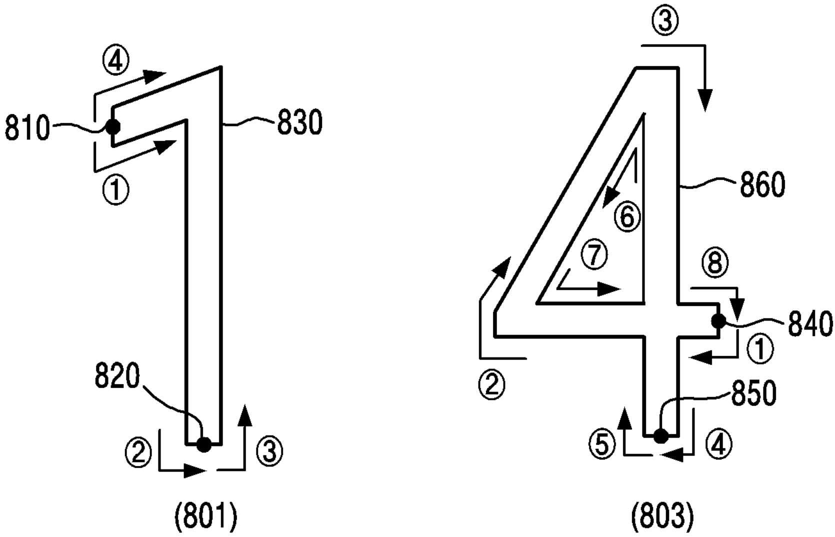
FIG. 8 is a diagram showing a path of text to be outputted on a display according to an embodiment.
Figure 9:
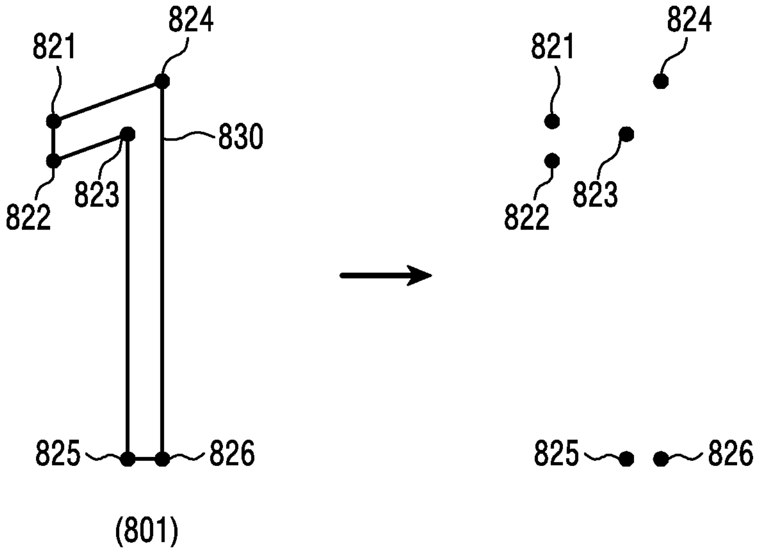
FIG. 9 is a diagram showing path transforms of text to be outputted on a display according to an embodiment.
Figure 9:
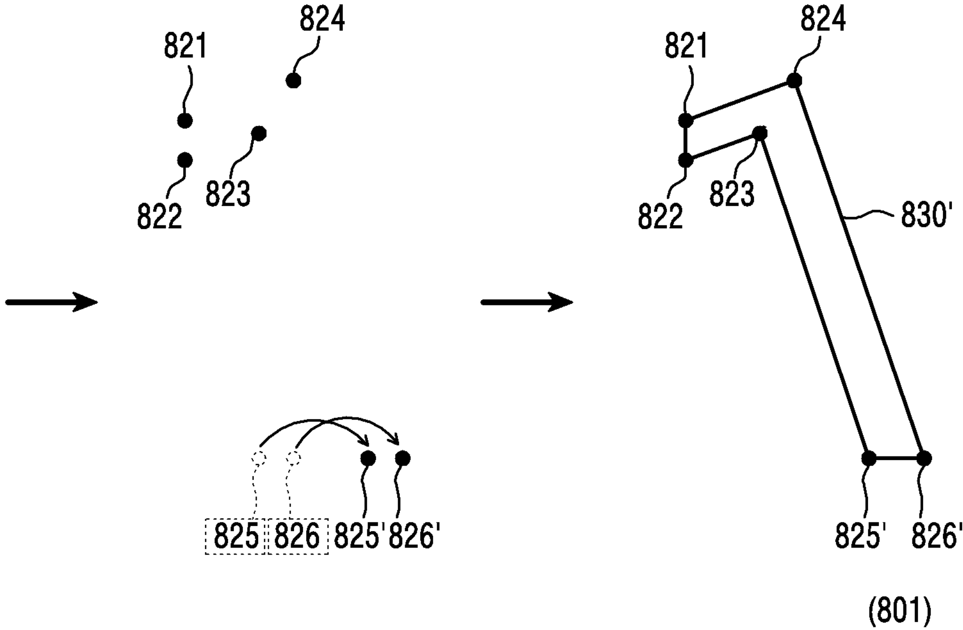

FIG. 8 is a diagram showing a path of text to be outputted on a display according to an embodiment. FIG. 9 is a diagram showing path transforms of text to be outputted on a display according to an embodiment.

Referring to FIG. 8, as at least part of the process for applying the animation effect to text (e.g., the text 510 of FIG. 5), a processor (e.g., the processor 250 of FIG. 2) may generate a path corresponding to the shape of a character based on a single contour of the character, which is included in the text 510. For example, the processor 250 may determine a start point and an end point for each of the plurality of the characters, and generate the path which lasts from the start point to the end point and follows the shape of the character.

According to an embodiment, the processor 250 may determine the start point to be a point between a section where the stroke starts according to the single contour and a section where the stroke ends for the corresponding character. In addition, the processor 250 may determine the end point to be an intermediate point of a section that is mapped last, when there is at least one section proceeding from the stroke start section in a first direction (e.g., stroke direction) and at least one section proceeding from the stroke end section in a second direction (e.g., the opposite direction of the stroke direction). Alternatively, when there is at least one section proceeding from the stroke start section in the first direction and at least one section proceeding from the stroke end section in the second direction, the processor 250 may determine the end point to be one point of the last section that is not mapped.

For example, with regard to determining the start point and the end point, for example, with respect to the first character 801, the processor 250 may determine a point 810 between the first section ① of the stroke start and the fourth section ④ of the end of the single contour of the first character 801 to be the start point. In addition, for the first character 801, if mapping the second section ② proceeding from the first section ① of the stroke start according to the single contour in the first direction (e.g., the stroke direction) and the third section ③ proceeding from the fourth section ④ of the stroke end according to the single contour in the second direction (e.g., the opposite direction of the stroke direction), the processor 250 may determine an intermediate point 820 of the sections mapped last (e.g., the second section ② and the third section ③ to be the end point. According to an embodiment, the processor 250 may apply the animation effect to the first character 801 for a designated time, along a path 830 of the first character 801 heading from the start point (e.g., the point 810) to the end point (e.g., the point 820).

As another example in relation to determining the start point and the end point, for the second character 803, the processor 250 may determine a point 840 between the first section ① of the stroke start and the eighth section ⑧ of the end of the single contour of the second character 803 to be the start point. In addition, for the second character 803, if mapping the second section ② proceeding from the first section ① of the stroke start according to the single contour in the first direction (e.g., the stroke direction) and the seventh section ⑦ proceeding from the eighth section ⑧ of the stroke end according to the single contour in the second direction (e.g., the opposite direction of the stroke direction), mapping the third section ③ and the sixth section ⑥, and mapping the fourth section ④ and the fifth section ⑤ in the similar manner, the processor 250 may determine an intermediate point 850 of the sections mapped last (e.g., the fourth section ④ and the fifth section ⑤ to be the end point. According to an embodiment, the processor 250 may apply the animation effect to the second character 803 for a designated time, along a path 860 of the second character 803 heading from the start point (e.g., the point 840) to the end point (e.g., the point 850).

Referring to FIG. 9, a processor (e.g., the processor 250 of FIG. 2) may change a path of at least part of a plurality of characters included in text (e.g., the text 510 of FIG. 5). For example, the processor 250 may identify points 821, 822, 823, 824, 825, and 826 for representing a first character 801 in the font, and move (e.g., move coordinates of the point or rotate and move the point on the X axis, the Y axis, or the Z axis) the position(s) of at least some points (e.g., 825 and 826) of the points 821, 822, 823, 824, 825, and 826. The processor 250 may generate a path 830' of which at least part is changed compared to the existing path 830 of the first character 801, by connecting points 821, 822, 823, 824, 825', and 826' of the first character 801 including at least some point (e.g., 825', and 826') moved in the position with a straight line, a curved line, or a combination of the straight line and the curved line. Hence, by changing the path of at least part of the plurality of the characters included in the text 510, and displaying the corresponding character with the animation effect based on the changed path, the processor 250 may implement the animation effect of the text that is converted in various manners.

Figure 10:
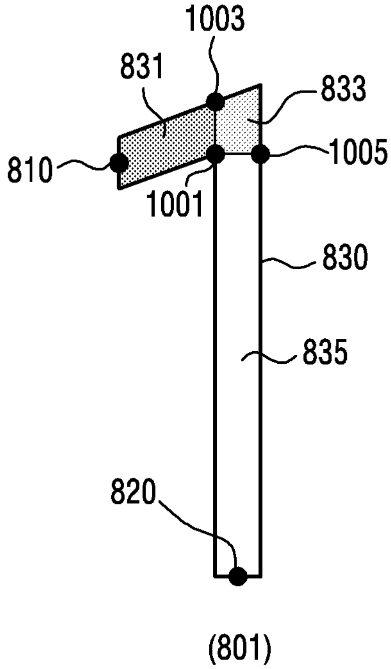
FIG. 10 is a diagram showing at least one section defined on a path of text to be outputted on a display according to an embodiment.
Figure 11:
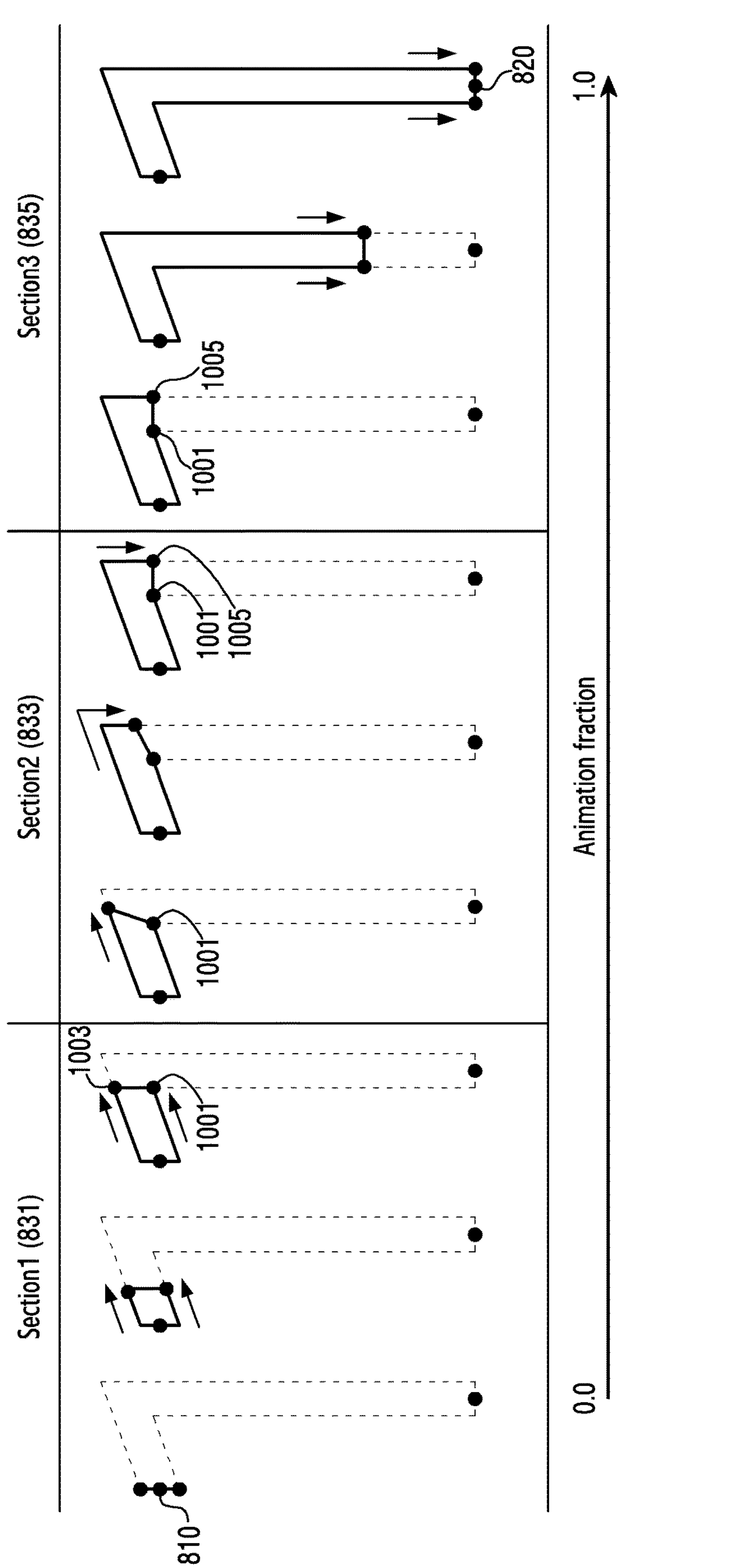
FIG. 11 is a diagram showing text to which an animation effect is applied according to an embodiment.

FIG. 10 is a diagram showing at least one section defined on a path of text to be outputted on a display according to an embodiment. FIG. 11 is a diagram showing text to which an animation effect is applied according to an embodiment.

According to an embodiment, a plurality of characters included in text (e.g., the text 510 of FIG. 5) each may include at least one of a straight section, a curved section, and a transition section (e.g., section between a straight section and another straight section, a section between a straight section and a curved section, or a section between a curved section and another curved section) on the path heading from a start point to an end point of a corresponding character. In this regard, a processor (e.g., the processor 250 of FIG. 2) may divide each path of the plurality of the characters into at least one section, to control an application speed of the animation effect for each straight section, curved section, and transition section included on the path of the character, during a designated time period for displaying the text 510 to which the animation effect is applied.

Referring to FIG. 10, for example, in a first character 801, the processor 250 may identify a portion on a path 830 where a section continuing from a start point 810 of the first character 801 toward an end point 820 in a first direction (e.g., the stroke direction) and a section continuing from the start point 810 toward the end point 820 in a second direction (e.g., the opposite direction of the stroke) correspond to each other. The processor 250 may divide the path 830 of the first character 801 into at least one section based on the identifying. For example, the processor 250 may identify that the section continuing in the first direction from the start point 810 to a first point 1001 on the path 830 corresponds to a section continuing in the second direction from the start point 810 to a second point 1003 on the path 830, and determine a portion on the path 830 defined by the start point 810, the first point 1001, and the second point 1003 as one section 831 (e.g., first section). Similarly, the processor 250 may identify that a section continuing in the first direction from the first point 1001 of the path 830 to the end point 820 corresponds to a section continuing in the second direction from a third point 1005 of the path 830 to the end point 820, and determine another portion on the path 830 defined by the first point 1001, the third point 1005, and the end point 820 as one section 835 (e.g., third section). In this case, the processor 250 may identify that the section continuing in the first direction and the section continuing in the second direction do not correspond to each other, i.e., they are not continuous, and may determine yet another portion on the path 830 as one section 833 (e.g., second section).

Referring to FIG. 10 and FIG. 11, the processor (e.g., the processor 250 of FIG. 2) may display each of a plurality of characters in the text (e.g., the text 510 of FIG. 5) on a display (e.g., the display 210 of FIG. 2) for a designated time period (e.g., 1 second) based on the animation effect. As an example of the displaying of the first character 801 to which the animation effect is applied, the processor 250 may determine a sequence of at least one section (e.g., the first section 831, the second section 833, and the third section 835) arranged from the start point 810 toward the end point 820 of the first character 801 to be a sequence for applying the animation effect to the first character 801. The processor 250 may continuously display the first character 801 for a designated time period (e.g., 1 second) in the determined sequence. For example, the processor 250 may display a part of the first character 801 from the start point 810 along the path of the first section 831 during a first time range within the designated time period (e.g., 1 second), display another part of the first character 801 continuing from the part of the first character 801 along the path of the second section 833 during a second time range after the first time range within the designated time period (e.g., 1 second), and display yet another part of the first character 801 continuing from the another part of the first character 801 along the path of the third section 835 during a third time range after the second time range within the designated time period (e.g., 1 second).

According to an embodiment, the processor 250 may display the first character 801 with a dotted line along the path of the first section 831, the path of the second section 833, and the path of the third section 835 in the sequence defined for the first character 801. According to another embodiment, the processor 250 may display the first character 801 with a solid line of a first color along the path of the first section 831, the path of the second section 833, and the path of the third section 835 in sequence defined for the first character 801, and then display inside of the solid line in a second color which is different from the first color. According to yet another embodiment, the processor 250 may display a part of the first character 801 with a solid line of a first color along the path of the first section 831 defined for the first character 801 and concurrently display inside of the solid line in a second color which is different from the first color, and display another part of the first character 801 along the path of the second section 833 and the path of the third section 835 in sequence in the similar manner.

Figure 12:
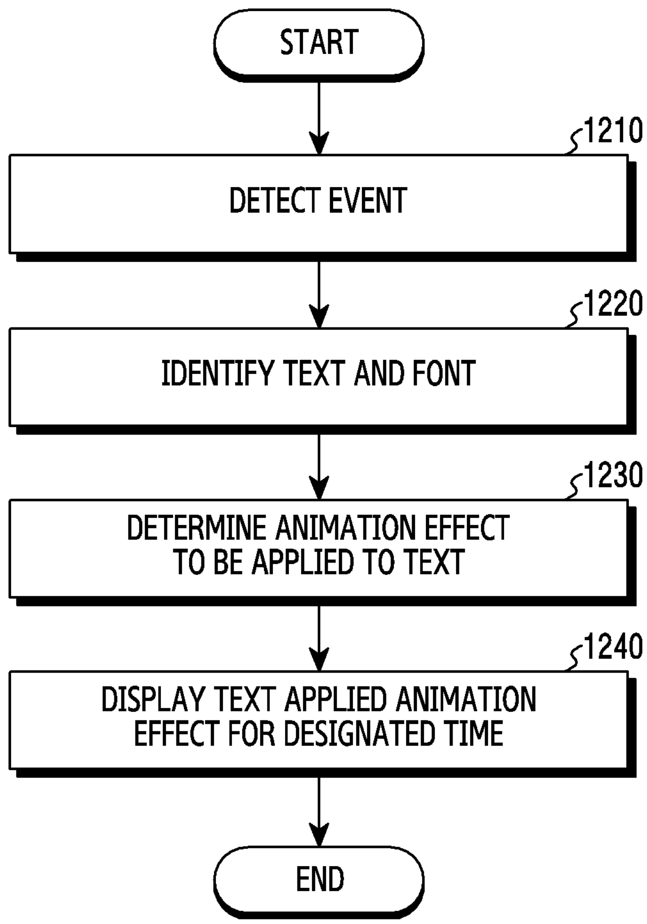
FIG. 12 is a diagram showing a method for providing an animation effect of an electronic device according to an embodiment.

FIG. 12 is a diagram showing a method for providing an animation effect of an electronic device according to an embodiment.

At least part of operations of the electronic device explained in FIG. 12 may be identical to or similar to the operations of the electronic device (or the processor, or the animation module) explained earlier in the drawings, and duplicative explanations of the identical or similar operations may be omitted in the following.

Referring to FIG. 12, in operation 1210, a processor (e.g., the processor 250 of FIG. 2) of the electronic device (e.g., the electronic device 101 of FIG. 1 or FIG. 2) may detect a designated event. For example, if receiving from at least one sensor (e.g., the sensor 220 of FIG. 2) an electrical signal or a data value indicating that a first housing (e.g., the first housing 311 of FIG. 3) and a second housing (e.g., the second housing 313 of FIG. 3) are disposed to make a second angle (e.g., between about 0 degree and 10 degrees) and to face (or, contact) each other, the processor 250 may determine occurrence of the designated event. In an embodiment, in response to detecting the designated event, the processor 250 may determine to execute an application which supports text displaying on a display (e.g., the display 210 of FIG. 2), and obtain from the application or another application at least one information related to the text (e.g., visual information, date information, weather information, battery information of the electronic device 101, or color and size information of the text representable through the text).

In operation 1220, in response to detecting the designated event, the processor 250 may identify text to display on the display 210 and a font to be applied to the text. For example, the processor 250 may obtain the text from the application to execute according to the occurrence of the designated event, and obtain the font corresponding to the text from a font file stored in a memory (e.g., the memory 240 of FIG. 2). According to an embodiment, the text may include a plurality of characters for indicating at least one of attribute related information (e.g., time information, date information, or weather information) of an application which supports displaying the corresponding text and operation state related information (e.g., battery information or location information) of the electronic device 101.

In operation 1230, in response to identifying the text and the font, the processor 250 may determine an animation effect to be applied to the text. In an embodiment, as a part of the process for determining the animation effect, the processor 250 may identify one or more contours in each of a plurality of characters in the text, and convert the one or more contours into a single contour represented with one stroke. In addition, as another part of the process for determining the animation effect, based on the single contour of each of the plurality of the characters, the processor 250 may determine a start point and an end point of a corresponding character, and generate a path continuing from the start point to the end point and following the shape of the character.

According to an embodiment, the processor 250 may determine the start point of each of the plurality of the characters, to be a point between a section where the stroke starts according to the single contour and a section where the stroke ends with respect to the corresponding character. In addition, the processor 250 may determine the end point of each of the plurality of the characters, to be an intermediate point of sections mapped last or one point of other sections not mapped last, when there is at least one section proceeding from the stroke start section in a first direction (e.g., stroke direction) according to the single contour and at least one section proceeding from the stroke end section in a second direction (e.g., a different direction from the stroke direction).

In an embodiment, as yet another part of the process for determining the animation effect, the processor 250 may divide the path of each of the plurality of the characters into at least one section. For example, in each of the plurality of the characters, the processor 250 may identify a portion on the path where a section continuing from the start point toward the end point in the first direction (e.g., the stroke direction) and a section continuing from the start point toward the end point in the second direction (e.g., a different direction from the stroke direction) correspond to each other, i.e. are continuous, and determine the identified portion to be one section. In addition, the processor 250 may identify another portion on the path where the section continuing from the start point toward the end point in the first direction and the section continuing from the start point toward the end point in the second direction do not correspond to each other, and determine the identified another portion to be one section.

In operation 1240, the processor 250 may display the text applied the animation effect on the display 210 for a designated time period (e.g., 1 second). For example, the processor 250 may display each of the plurality of the characters in the text for the designated time period based on at least one section divided from the path of the corresponding character. In this respect, for each of the plurality of the characters, the processor 250 may determine a sequence of at least one section arranged from the start point toward the end point of the corresponding character to be the sequence for applying the animation effect to the corresponding character. Based on the determined sequence, the processor 250 may display a part of the character along the path of the first section from the start point during a first time range within the designated time period, and display another part of the character continuing from the part of the character along the path of the second section which follows the first section in sequence during a second time range after the first time range within the designated time period.

An electronic device (e.g., the electronic device 101 of FIG. 2, the electronic device 101*a* of FIG. 3, or the electronic device 101*b* of FIG. 4) according to an embodiment may include a display (e.g., the display 210 of FIG. 2, the second display 320*b* of FIG. 3, or the third display 410 of FIG. 4) and a processor (e.g., the processor 250 of FIG. 2) electrically connected with the display.

According to an embodiment, the processor may detect a designated event, identify text to be outputted on the display and a font applied to the text in response to detecting the designated event, determine an animation effect to be applied to the text based on the font, and display the text to which the animation effect is applied on the display for a designated time period in response to detecting the designated event.

According to an embodiment, the text may include a plurality of characters.

According to an embodiment, where in applying the animation effect, the processor may be configured to display each of the plurality of the characters for the designated time period along a path corresponding to a character shape from a start point toward an end point of each of the plurality of the characters.

According to an embodiment, the electronic device may further include a housing (e.g., the housing 310 of FIG. 3) including a first housing (e.g., the first housing 311 of FIG. 3) disposed on one side and a second housing (e.g., the second housing 313 of FIG. 3) disposed on another side of a designated folding axis, and at least one sensor (e.g., the sensor 220 of FIG. 2).

According to an embodiment, the processor may determine that the designated event has occurred when receiving from the at least one sensor an electrical signal or a data value indicating that the first housing and the second housing are disposed to form a designated angle or are facing each other.

According to an embodiment, the processor may, in response detecting the designated event, determine to execute an application which supports the text to be outputted on the display, and the text may indicate at least one attribute related information of the application and/or operation state related information of the electronic device.

According to an embodiment, the processor may identify one or more contours in each of the plurality of the characters.

According to an embodiment, the processor may convert the one or more contours identified in each of the plurality of the characters, into a single contour including a straight line, a curved line, or a combination of the straight line and the curved line from one point on the one or more contours to another point along one stroke continuing based on a designated drawing sequence.

According to an embodiment, the processor may determine the start point of each of the plurality of the characters, to a point between a section where the one stroke starts and a section where the one stroke ends in each of the plurality of the characters.

According to an embodiment, the processor may determine the end point of each of the plurality of the characters to be an intermediate point of sections mapped last, when mapping at least one section preceding from a section where the one stroke starts in a first direction and at least one section preceding from a section where the one stroke ends in a second direction which is different from the first direction in each of the plurality of the characters.

According to an embodiment, the processor may determine the end point of each of the plurality of the characters to be one point of a section not mapped last, when mapping at least one section preceding from a section where the one stroke starts in a first direction and at least one section preceding from a section where the one stroke ends in a second direction which is different from the first direction in each of the plurality of the characters.

According to an embodiment, the processor may identify a portion on the path for each of the plurality of the characters where a section continuing in a first direction of the one stroke from the start point toward the end point and a section continuing in a second direction which is different from the first direction from the start point toward the end point correspond to each other, and divide the path of each of the plurality of the characters into at least one section based on identifying.

According to an embodiment, the processor may determine a sequence of the at least one section arranged from the start point toward the end point of each of the plurality of the characters for applying the animation effect for each of the plurality of the characters, and display each of the plurality of the characters by applying the animation effect based on the sequence.

According to an embodiment, the font may include a vector based font which connects points for representing each of the plurality of the characters with one or more lines each having a direction and a length.

According to an embodiment, the processor may normalize a size of the text within a size range such that the points for representing each of the plurality of the characters do not exceed a designated threshold.

According to an embodiment, the processor may identify first points for representing a first character in the plurality of the characters, move a position of at least one second point in the first points, and change the path corresponding to the character shape of the first character based on the first points including the at least one second point at the moved position.

A method for providing an animation effect of an electronic device (e.g., the electronic device 101 of FIG. 2, the electronic device 101*a* of FIG. 3, or the electronic device 101*b* of FIG. 4) including a display (e.g., the display 210 of FIG. 2, the second display 320*b* of FIG. 3, or the third display 410 of FIG. 4) according to an embodiment may include detecting a designated event, identifying text to be outputted on the display and a font applied to the text in response to detecting the designated event, the text including a plurality of characters, determining an animation effect to be applied to the text based on the font, and in response to detecting the designated event, displaying the text to which the animation effect is applied on the display for a designated time period by displaying each of the plurality of the characters for the designated time period along a path corresponding to a character shape from a start point toward an end point of each of the plurality of the characters.

According to an embodiment, detecting the designated event may include determining that the designated event has occurred when receiving from at least one sensor an electrical signal or a data value indicating that a first housing disposed on one side and a second housing disposed on another side of a designated folding axis are disposed to form a designated angle or are facing each other.

According to an embodiment, determining the animation effect to be applied to the text may include identifying one or more contours in each of the plurality of the characters to which the front is applied, and converting the one or more contours identified in each of the plurality of the characters, into a single contour including a straight line, a curved line, or a combination of the straight line and the curved line from one point on the one or more contours to another point along one stroke continuing based on a designated drawing sequence.

According to an embodiment, determining the animation effect to be applied to the text may include determining the start point of each of the plurality of the characters to be a point between a section where the one stroke starts and a section where the one stroke ends in each of the plurality of the characters.

According to an embodiment, determining the animation effect to be applied to the text may include at least one of determining the end point of each of the plurality of the characters to be an intermediate point of sections mapped last, when mapping at least one section preceding from a section where the one stroke starts in a first direction and at least one section preceding from a section where the one stroke ends in a second direction which is different from the first direction in each of the plurality of the characters, and determining the end point of each of the plurality of the characters to be one point of a section not mapped last, when mapping the at least one section preceding from the section where the one stroke starts in the first direction and the at least one section preceding from the section where the one stroke ends in the second direction in each of the plurality of the characters.

According to an embodiment, determining the animation effect to be applied to the text may include identifying a portion on the path for each of the plurality of the characters where a section continuing in a first direction of the one stroke from the start point toward the end point and a section continuing in a second direction which is different from the first direction from the start point toward the end point correspond to each other, and dividing the path of each of the plurality of the characters into at least one section based on identifying.

According to an embodiment, displaying the text applied the animation effect on the display for the designated time period may include determining a sequence of the at least one section arranged from the start point toward the end point of each of the plurality of the characters for applying the animation effect for each of the plurality of the characters, and displaying each of the plurality of the characters by applying the animation effect based on the sequence.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:

a display;

memory storing instructions; and at least one processor, wherein when the instructions executed by the at least one processor dividually or collectively, cause the electronic device to:

detect a designated event, identify text to be outputted on the display, the text comprising a plurality of characters, for each character of the plurality of characters:

determine a shape of the character, based on a font, before displaying or applying an animation effect, wherein the shape of the character includes a first path from a start point to at least intermediate points to an end point and a second path from the start point to at least one second intermediate point to the end point, and wherein each of the at least one first intermediate points correspond to a respective one of the at least one second intermediate points; and based on the determined shape of the character, display portions of the character and applying the animation effect simultaneously along the first path beginning from the start point at a starting time moving to the at least one first intermediate points at one or more intermediate times and then moving to the end point at an ending time, wherein at the one or more intermediate times, portions of the character from the at least one first intermediate points to the end point are not displayed, and the second path beginning from the start point at the starting time moving to the at least one second intermediate points and then moving to the end point at the ending time, wherein at the one or more intermediate times, portions of the character from the at least one second intermediate points to the end point are not displayed, and wherein each pair of the corresponding first intermediate point and second intermediate point is displayed simultaneously.

2. The electronic device of claim 1, further comprising:

a housing comprising a first housing disposed on one side and a second housing disposed on another side of a designated folding axis; and at least one sensor, wherein the processor is configured to:

determine that the designated event has occurred when receiving from the at least one sensor an electrical signal or a data value indicating that the first housing and the second housing are disposed to form a designated angle or are facing each other.

3. The electronic device of claim 1, wherein the processor is configured to:

in response detecting the designated event, determine to execute an application which supports the text to be outputted on the display, and wherein the text indicates at least one attribute related information of the application and/or operation state related information of the electronic device.

4. The electronic device of claim 1, wherein determining the shape of the character comprises:

identify one or more contours of the character.

5. The electronic device of claim 4, wherein the processor is configured to:

convert the one or more contours identified in the character into a single contour comprising a straight line, a curved line, or a combination of the straight line and the curved line from one point on the one or more contours to another point along one stroke continuing based on a designated drawing sequence before displaying or applying the animation effect.

6. The electronic device of claim 5, wherein the processor is configured to:

determine the start point of each of the plurality of the characters to be a point between a section where the one stroke starts and a section where the one stroke ends in each of the plurality of the characters.

7. The electronic device of claim 5, wherein the processor is configured to:

determine the end point of each of the plurality of the characters to be an intermediate point of sections mapped last, when mapping at least one section preceding from a section where the one stroke starts in a first direction and at least one section preceding from a section where the one stroke ends in a second direction which is different from the first direction in each of the plurality of the characters.

8. The electronic device of claim 5, wherein the processor is configured to:

determine the end point of each of the plurality of the characters to be one point of a section not mapped last, when mapping at least one section preceding from a section where the one stroke starts in a first direction and at least one section preceding from a section where the one stroke ends in a second direction which is different from the first direction in each of the plurality of the characters.

9. The electronic device of claim 5, wherein the processor is configured to:

identify a portion on the path for each of the plurality of the characters where a section continuing in a first direction of the one stroke from the start point toward the end point and a section continuing in a second direction which is different from the first direction from the start point toward the end point correspond to each other, and divide the path of each of the plurality of the characters into at least one section based on identifying.

10. The electronic device of claim 9, wherein the processor is configured to:

determine a sequence of the at least one section arranged from the start point toward the end point of each of the plurality of the characters for applying the animation effect for each of the plurality of the characters, and display each of the plurality of the characters by applying the animation effect based on the sequence.

11. The electronic device of claim 1, wherein the font further comprises a vector based font which connects points for representing each of the plurality of the characters with one or more lines each having a direction and a length.

12. The electronic device of claim 11, wherein the processor is configured to:

normalize a size of the text within a size range such that the points for representing each of the plurality of the characters do not exceed a designated threshold.

13. The electronic device of claim 11, wherein the processor is configured to:

identify first points for representing a first character in the plurality of the characters, move a position of at least one second point in the first points, and change the path corresponding to the character shape of the first character based on the first points comprising the at least one second point at the moved position.

14. A method for providing an animation effect of an electronic device including a display, the method comprising:

detecting a designated event;

identifying text to be outputted on the display, the text comprising a plurality of characters;

for each character of the plurality of characters:

determining a shape of the character, based on a font, before displaying or applying an animation effect, wherein the shape of the character includes a first path from a start point to a first one or more intermediate points to an end point and a second path from the start point to at least one second intermediate points to the end point, and wherein each of the at leas one first intermediate points correspond to a respective one of the at least one second intermediate points; and based on the determined shape of the character, display portions of the character and applying the animation effect simultaneously along the first path beginning from the start point at a starting time moving to the at least one first intermediate points at one or more intermediate times and then moving end point at an ending time, wherein at the one or more intermediate times, portions of the character from the at least one first intermediate points to the end point are not displayed, and the second path beginning from the start point at the starting time moving to the at least one second intermediate points and then moving to the end point at the ending time, wherein at the one or more intermediate times, portions of the character from the at least one second intermediate points to the end point are not displayed, and wherein each pair of the corresponding first intermediate point and second intermediate point is displayed simultaneously.

15. The method for providing the animation effect of claim 14, wherein detecting the designated event further comprises:

determining that the designated event has occurred when receiving from at least one sensor an electrical signal or a data value indicating that a first housing disposed on one side and a second housing disposed on another side of a designated folding axis are disposed to form a designated angle or are facing each other.

16. The method for providing the animation effect of claim 14, wherein determining the shape of the character comprises:

identifying one or more contours of the character to which the font is applied; and converting the one or more contours identified in the character, into a single contour comprising a straight line, a curved line, or a combination of the straight line and the curved line from one point on the one or more contours to another point along one stroke continuing based on a designated drawing sequence before displaying or applying the animation effect.

17. The method for providing the animation effect of claim 16, wherein determining the shape of the character comprises:

determining the start point of each of the plurality of the characters to be a point between a section where the one stroke starts and a section where the one stroke ends in each of the plurality of the characters.

18. The method for providing the animation effect of claim 16, wherein determining the shape of the character comprises at least one of:

determining the end point of each of the plurality of the characters to be an intermediate point of sections mapped last, when mapping at least one section preceding from a section where the one stroke starts in a first direction and at least one section preceding from a section where the one stroke ends in a second direction which is different from the first direction in each of the plurality of the characters; and determining the end point of each of the plurality of the characters to be one point of a section not mapped last, when mapping the at least one section preceding from the section where the one stroke starts in the first direction and the at least one section preceding from the section where the one stroke ends in the second direction in each of the plurality of the characters.

19. The method for providing the animation effect of claim 16, wherein determining the shape of the character further comprises:

identifying a portion on the path for each of the plurality of the characters where a section continuing in a first direction of the one stroke from the start point toward the end point and a section continuing in a second direction which is different from the first direction from the start point toward the end point correspond to each other; and dividing the path of each of the plurality of the characters into at least one section based on identifying.

20. The method for providing the animation effect of claim 19, further comprising displaying the text to which the animation effect is applied on the display for the designated time period, wherein displaying further comprises:

determining a sequence of the at least one section arranged from the start point toward the end point of each of the plurality of the characters for applying the animation effect for each of the plurality of the characters; and displaying each of the plurality of the characters by applying the animation effect based on the sequence.

* * * * *